April 26, 1966 F. S. CILINO 3,248,476

DATA TRANSMISSION AND COLLECTION SYSTEMS

Filed Dec. 29, 1961 10 Sheets-Sheet 1

INVENTOR.
F. S. CILINO
BY
R. Y. Peters
ATTORNEY

April 26, 1966 F. S. CILINO 3,248,476

DATA TRANSMISSION AND COLLECTION SYSTEMS

Filed Dec. 29, 1961 10 Sheets-Sheet 2

INVENTOR.
F. S. CILINO

BY R. Y. Peters

ATTORNEY

April 26, 1966 F. S. CILINO 3,248,476

DATA TRANSMISSION AND COLLECTION SYSTEMS

Filed Dec. 29, 1961 10 Sheets-Sheet 3

INVENTOR.
F. S. CILINO
BY
R. Y. Peters
ATTORNEY

DATA TRANSMISSION AND COLLECTION SYSTEMS

Filed Dec. 29, 1961 10 Sheets-Sheet 4

INVENTOR.
F. S. CILINO
BY
R. Y. Peters
ATTORNEY

INVENTOR.
F. S. CILINO
BY
R. V. Peters
ATTORNEY

DATA TRANSMISSION AND COLLECTION SYSTEMS

Filed Dec. 29, 1961 10 Sheets-Sheet 6

INVENTOR.
F. S. CILINO
BY R. Y. Peters
ATTORNEY

INVENTOR.
F. S. CILINO
BY
R. Y. Peters
ATTORNEY

INVENTOR.
F. S. CILINO
BY
R. V. Peters
ATTORNEY

April 26, 1966 F. S. CILINO 3,248,476

DATA TRANSMISSION AND COLLECTION SYSTEMS

Filed Dec. 29, 1961 10 Sheets-Sheet 9

INVENTOR.
F. S. CILINO
BY
R. Y. Peters
ATTORNEY

INVENTOR.
F. S. CILINO
BY R. Y. Peters
ATTORNEY 3,248,476
Patented Apr. 26, 1966

3,248,476

DATA TRANSMISSION AND COLLECTION SYSTEMS

Francesco S. Cilino, Hamilton Square, N.J., assignor to Western Electric Company, Incorporated, New York, N.Y., a corporation of New York Filed Dec. 29, 1961, Ser. No. 163,265
6 Claims. (Cl. 178—2)

This invention relates to data transmission and collection systems. More particularly, this invention relates to data transmission and collection systems wherein data originating at a plurality of input stations is directed in a predetermined priority sequence to a tape punching device.

Greatly increased efficiency in manufacturing operations can result from close control of production. For example, in the manufacturing of materials requiring sequential processing steps, greatly increased efficiency can result from the forecast of production and the immediate scheduling of incoming orders for production. To so forecast and schedule orders for production, it is often desirable, if not necesasry, to collect information or data right from the machines or operators performing sequential processing steps on the production line. This data is then fed into a computer, which, because of its ability to handle and store a great deal of diverse data, lends itself very well to such production control. However, in order to take information right from machines or operators on the production line, it is necessary to provide a plurality of data input stations on the production line from which data can be centrally and automatically collected.

It is accordingly an object of this invention to provide a novel data transmission and collection system.

Another object of the invention resides in the provision of a data transmission and collection system wherein a tape punching device, responsive to a central control circuit, generates and directs a synchronizing signal to a phase controlling circuit which in turn operates code conversion apparatus to decrease the number of parallel signals and increase the number of serial bits of the parallel signals transmitted from one of a plurality of data input stations having a predetermined priority sequence.

A further object of this invention is to provide a data transmission and collection system including a high-speed sixty-cycle scanner for timing a primary scanning operation of a plurality of relay trees and performing a secondary scanning operation.

Apparatus illustrating certain features of this invention may include a plurality of data input stations placed at locations where information or data originates. Associated with each data input station is a station control circuit which cooperates with a central control circuit to establish a transmission priority among the plural input stations. The station control circuit also, upon the transmission of data from one of the input stations, prevents all the other input stations from transmitting until the completion of such transmission. The station control circuit also cooperates with the central control circuit to energize a punching device. A phase control circuit responsive to an output pulse of the punching device synchronizes the various components of the data transmission and collection system. Moreover, the central control circuit operates a scanner which cooperates with a stepping circuit and a plurality of relay trees to convert a plurality of parallel signals each of a single serial bit of data transmitted from the data input station to a lesser number of parallel signals each of plural serial bits. The resulting parallel signals of plural serial bits of data operate the punching device which records the data from the input station on tape.

A more complete understanding of the invention may be obtained from the following detailed description of a data transmission and collection system forming a specified embodiment of the invention when considered in conjunction with the accompanying drawings, wherein.

Figure 14:
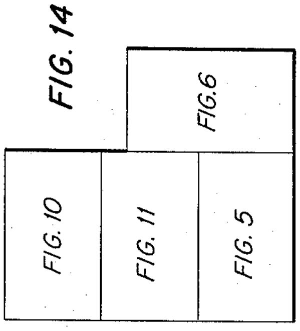

FIG. 14 discloses the manner in which FIGS. 5, 6, 10 and 11 may be advantageously disposed to illustrate the instant invention.

It is to be noted that FIGS. 3–11 and 13 employ a type of notation referred to as "detached contacts" in which a line perpendicular to a circuit lead represents normally closed contacts and "X" represents normally open contacts, "normally" referring to the unoperated condition of a relay or other contact controlling device, such as a cam or stepping switch. For a complete exposition of this type of notation reference should be made to an article entitled "Improved Detached Contact Circuit Drawing" by F. T. Meyer, vol. 74, Electrical Engineering, p. 645, August 1955.

It is also to be noted that the reference designations of the components of the present invention indicate in each instance the number of the figure on which the component is located, the function of the component, and in the case of some components, the component number. For example, a relay or other contact controlling device may be referred to in the specification as 3HB where the 3 represents the figure on which the relay or other contact controlling device is located and the HB represents the function, such as station B hold. Also, the contacts of a particular relay or other contact controlling device use the same functional designation as the relay or device which operates such contacts. Since many different sets of contacts may be controlled by one relay or device, the sets of contacts are also represented by another number which designates a particular set of contacts. For example, a set of contacts may be referred to as 3HB4, where the 3 indicates the figure on which such contacts are located, the HB is the functional designation of the particular relay or other contact controlling device which operates such contacts, and the 4 indicates a particular set of the contacts. Additionally, if, for example, the contacts are designated 3HB1—4, the 1–4 refers to four sets of contacts numbered from 1 to 4.

Figure 2:
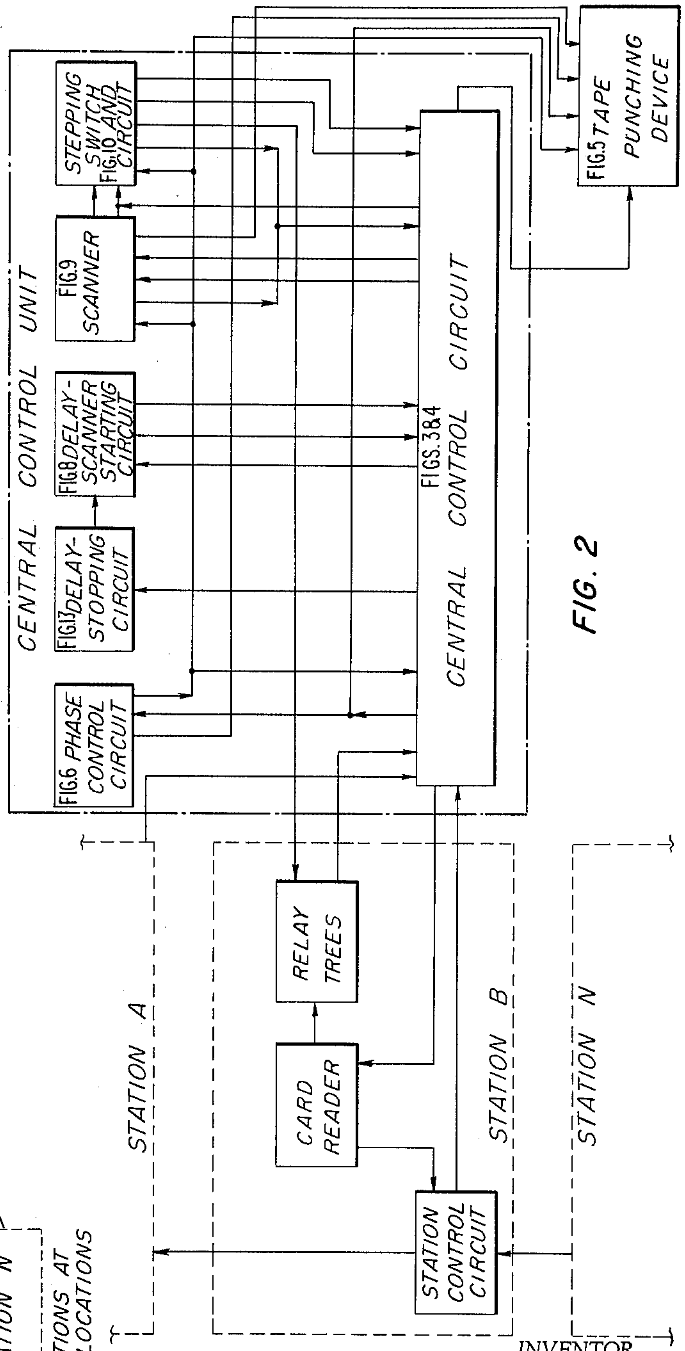
FIG. 2 illustrates a detailed block diagram of the system of FIG. 1 when transmitting and collecting data from a particular station.

Moreover, the various circuit diagrams of FIGS. 3–11 and 13 are related to the overall system block diagram of FIG. 2 by outlining such circuit diagrams with phantom lines and indicating by appropriate titles the particular block of the block diagram of FIG. 2 in which such circuit diagram is located.

GENERAL DESCRIPTION

Figure 1:
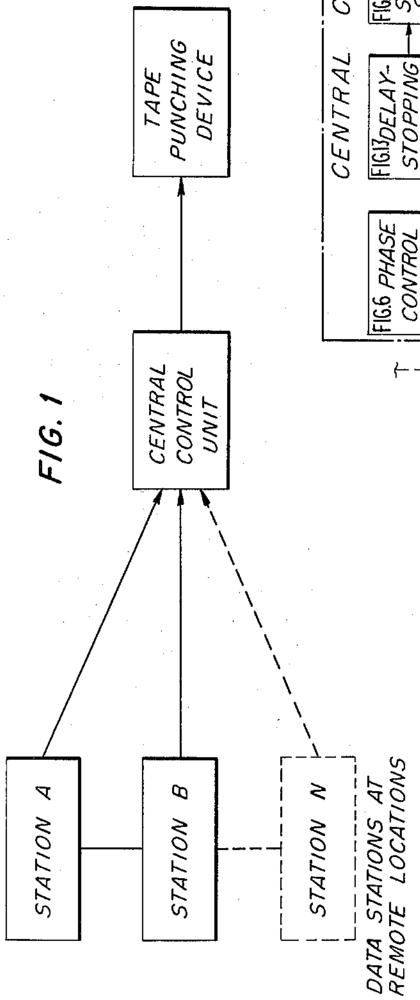
FIG. 1 is an overall block diagram of the data transmission and collection system showing a plurality of stations for data input at remote locations, a central control unit into which such data is fed by the remote stations, and a tape punching device for recording the data fed from the central control unit.

There is shown in FIG. 1 an overall block diagram of the data transmission and collection system which illustrates a plurality of stations for data input at remote locations, such as machines on a production line. Although FIG. 1 only shows three stations designated A, B and N, it is to be understood that the system may embody any number of stations. In a typical use of the data transmission and collection system—control of the production of printed circuit boards—twenty different remote data input stations were used.

Data is transmitted from the stations, one at a time, to a central control unit. The central control unit then feeds the data into a tape punching device to record the data by means of perforations on conventional teletypewriter tape.

Referring now to FIG. 2 there is shown a more detailed block diagram of the data transmission and collection system of FIG. 1.

In order to show how data is transmitted from a data entry device, such as a manual selector switch, a punch card and card reader, or the like, located at a particular station; how data is collected on tape; and how, when such station is transmitting data, all other stations of the system are locked out, it will be assumed in the following description that a card, having data recorded thereon, is inserted into a card reader at station B. By so using station B as an example, it will be additionally shown precisely how a priority and lockout system function.

Consequently, FIG. 2 illustrates the components of station B in detail and only illustrates in a general way a higher priority station A and a lower priority station N.

An operator desiring to transmit data from station B located, for example, at a machine on a production line inserts a card having data thereon into the card reader at station B to condition a station control circuit, also at station B, for operation.

The operator then depresses and releases a push button in the station control circuit to initiate the transmission of data. If no stations are transmitting or if no stations of higher priority are waiting to transmit, a priority and lockout system, serially interconnecting the various station control circuits and a central control circuit located in the central control unit, allows the station control circuit of station B to operate a motor control circuit in the central control circuit. On the other hand, if another station is transmitting or a station of higher priority is waiting to transmit, the station control circuit operates the motor control circuit only after the completion of the transmission of the transmitting or waiting station of higher priority.

Operation of the motor control circuit of the central control circuit energizes a punching motor in the tape punching device.

Operation of the motor produces a synchronizing pulse which is fed to a phase control circuit located in the central control unit.

Thereupon, the phase control circuit adjusts (if such circuit determines that it is necessary) the phase relationship of a stepping switch and circuit, a scanner, a punching pulse source which is located in the central control circuit and the tape punching device. The stepping switch and circuit as well as the scanner are located in the central control unit.

Next, the central control circuit operates a delay-scanner starting circuit located in the central control unit which allows the punch motor of the tape punching device to obtain rated speed and allows the phase control circuit to operate prior to the operation of the scanner.

The delay-scanner starting circuit then operates an initiating circuit in the central control circuit which operates the scanner. The scanner times all the primary scanning operations of a plurality of relay trees located at station B and performs a secondary scanning operation.

The scanner operates the stepping switch and circuit which, in turn, operates the relay trees.

A plurality of pulses are fed from the punching pulse source located in the central control circuit to a plurality of normally open contacts (which have been selectively closed by the card in accordance with the data thereon) of the card reader of station B. From the card reader, the pulses are fed to the relay trees associated therewith.

As previously mentioned, the relay trees are operated by the stepping switch; such relay trees perform a primary scanning operation to thereby convert a plurality of parallel signals each of one serial bit of data down to a lesser number of parallel signals each having a plural number of serial bits. Such parallel signals of serial bits are fed to the central control circuit where a format circuit separates blocks of data. From the central control circuit, these signals are fed to the scanner where a secondary scanning operation is performed to further reduce the parallel signals and increase the serial bits.

Next, the signals are fed from the scanner into the tape punching device where a plurality of punches perforate tape to record data thereon.

While the stepping switch is in its last position, it operates the format control circuit in the central control circuit to cause the tape punching device to punch a code on the tape which serves to separate blocks of data.

Also while the stepping switch is in its last position, it operates in conjunction with the scanner, a gating circuit in the central control circuit which prevents the tape punching device from recording any more data on the tape after the last transmission of data from the card reader.

Additionally, while the stepping switch is in its last position, it is reset by the cooperative action of the scanner and the central control circuit.

Upon resetting of the stepping switch, it operates a release circuit of the central control circuit which causes the circuits of station B and some of the circuits of the central control circuit to return to their normal or unoperated condition. At this time, if no station is waiting to transmit or if no station starts to transmit during a predetermined timing cycle of a delay-stopping circuit of the central control unit, the data transmission and collection system is de-energized to prevent unnecessary wear on the components thereof, especially the tape punching device, and does not needlessly use electrical energy. More particularly, at this time if no station is waiting to transmit or if no station starts to transmit during the timing cycle of the delay-stopping circuit, the central control circuit operates the delay-stopping circuit which de-energizes the delay-scanner starting circuit. De-energization of the delay-scanner starting circuit releases the motor control circuit of the central control circuit which de-energizes the punch motor and the phase control circuit.

On the other hand, if a station is waiting to transmit or starts to transmit during the timing cycle of the delay-stopping circuit, the delay-scanner starting circuit, the punch motor and the phase control circuit are not de-energized. Thus, the data transmission and collection system is prepared to perform another transmission and collection operation without the necessity of restarting the punch motor and resynchronizing the components of the system.

DETAILED DESCRIPTION

*Station and central control circuits*

Initially, ready light 3RB at station B is energized over a path including ground, light 3RB, normally closed contacts 3HB1 of unoperated hold relay 3HB, normally closed contacts 3SB1 of unoperated station relay 3SB to positive battery. Energization of the light 3RB indicates that station B is idle and ready to receive information or data from the card.

The card is inserted into the card reader (shown only diagrammatically in FIG. 11) at station B by an operator. Insertion of the card closes card reader microswitch contacts 3MB which condition normally open contacts 3PBB1 of a push button (not shown) for operation.

The operator then depresses the push button which closes normally open contacts 3PBB1 and 3PBB2 and opens normally closed contacts 3PBB3. Closure of contacts 3PBB1 results in the operation of hold relay 3HB over a path including ground, now closed microswitch contacts 3MB, now closed contacts 3PBB1, winding of relay 3HB, normally closed contacts 3SB2 of unoperated relay 3SB to positive battery.

Operation of relay 3HB opens normally closed contacts 3HB1 and 3HB2 and closes normally open contacts 3HB3, 3HB4 and 3HB5.

Opening of contacts 3HB1 opens the energizing path of light 3RB thereby indicating that station B is no longer idle.

Opening of normally closed contacts 3HB2 has no effect at this time because the push button is still depressed and the normally open contacts 3PBB2, which shunt now open contacts 3HB2, are still closed. Therefore, a series priority line 3PL is not open and all lower priority stations are not locked out or prevented from operating. In other words, control by the 3HB2 contacts of the priority line 3PL is delayed until the operator releases the push button. More particularly, a lower priority station relay 3SN can still be energized over a path including ground, winding of relay 3SN, contacts 3PBN3 of a released push button, contacts 3HN5 of an operated hold relay 3HN, priority line 3PL, contacts 3PBB2 of the depressed push button of station B, priority line 3PL, contacts 3HA2 of unoperated relay 3HA, contacts 3HLP2, lockout line 3LL, contacts 3LP3, 3SA3, 3SB3 and 3SN3 to positive battery. Thus, the operator cannot prevent the lower priority stations from operating or make a repetitious entry of data by holding the push button depressed.

Closure of contacts 3HB3, which are shunted around contacts 3PBB1, maintains relay 3HB operated when the push button is subsequently released by the operator and contacts 3PBB1 are subsequently opened.

Closure of contacts 3HB4 energizes waiting light 3WB indicating that station B is in a queue or line-up waiting to have the data on the card, which has been inserted in station B, read or indicating that such card is being read. Such energizing path is traced from positive battery, contacts 3HB4, light 3WB to ground.

Closure of contacts 3HB5 has no effect at this time because the push button is still depressed and the normally closed contacts 3PBB3 are still open. Thus, at this time station relay 3SB cannot operate to start data transmission and collection.

Next, the operator releases the push button which opens normally open contacts 3PBB1 and 3PBB2 and closes normally closed contacts 3PBB3.

Upon opening of contacts 3PBB2 the series priority line 3PL is opened and all lower priority stations are locked out or prevented from operating. The opening of contacts 3PBB2, of course, will not interfere with any other station (whether of lower or higher priority) which is transmitting. Further, a lower priority station relay 3SN cannot now be energized since the energizing path (previously traced) for such relay 3SN is now opened by the normally open contacts 3PBB2 which shunt now open contacts 3HB2.

If there is a queue or a line-up of higher priority stations which are waiting to transmit or if there is any station (whether of lower or higher priority) transmitting, station relay 3SB does not operate until such waiting or transmitting ends. For example, if: (1) station A is transmitting, the operating path of relay 3SB is opened by the operation of station relay 3SA and the opening of contacts 3SA3; or (2) station A is waiting to transmit, the operating path of relay 3SB is opened by the operation of station hold relay 3HA and the opening of contacts 3HA2; or (3) station N is transmitting, the operating path of relay 3SB is opened by the operation of station relay 3SN and the opening of contacts 3SN3.

On the other hand, if there is no queue or line-up of higher priority stations which are waiting to transmit, or if there is no station transmitting, station relay 3SB operates. More particularly, if higher priority station A is not waiting to transmit or is not transmitting, and if lower priority station N is not transmitting, station relay 3SB operates over a path including ground, winding of relay 3SB, now closed contacts 3PBB3 and 3HB5, priority line 3PL, normally closed contacts 3HA2 of unoperated hold relay 3HA, normally closed contacts 3HLP2 of unoperated hold leader punching relay 3HLP, lockout line 3LL, contacts 3SA3, 3SB3, 3SN3 to positive battery.

Operation of relay 3SB opens normally closed contacts 3SB1, 3SB2, 3SB3 and closes normally open contacts 3SB4, 3SB5, 4SB6, 4SB7, 4SB8, 8SB9, 11SB10.

Opening of contacts 3SB2 opens the energizing circuit of hold relay 3HB, thereby releasing such relay 3HB and closing normally closed contacts 3HB1 and 3HB2 and opening normally open contacts 3HB3, 3HB4 and 3HB5.

Although contacts 3HB1 are now closed, the ready light 3RB is maintained de-energized by the opening of normally closed contacts 3SB1 slightly prior in time to the closing of contacts 3HB1. Thus the ready light 3RB remains de-energized so that it does not incorrectly indicate that station B is idle.

Closure of normally open contacts 3SB5 maintains relay 3SB operated even though the contacts 3HB5 have opened. Such operation is maintained under the control of contacts 3R1 of release relay 4R.

Opening of contacts 3SB3 opens the lockout line 3LL to prevent the operation of all other station relays once station relay 3SB is operated. These contacts 3SB3 are opened only after contacts 3SB5 have closed, thereby causing relay 3SB to reach a fully operated condition.

Although contacts 3HB4 are now opened by the release of relay 3HB, waiting light 3WB remains energized by the closing of contacts 3SB4 slightly prior in time to the opening of contacts 3HB4. Hence, light 3WB continues to indicate that station B is waiting to transmit or is transmitting.

*Punch motor of tape punching device*

Closure of contacts 4SB6 operates motor control relay 4MC of the central control circuit.

Operation of relay 4MC energizes a punch motor 5M of a tape punching device over a path including now closed contacts 5MC1 and line alternating current source 5LAC. When contacts 5MC1 close, a conventional starting circuit (described in detail in Bulletin 215B, Technical Manual High Speed Tape Punch Set [BRPE], published by Teletype Corporation, 1960), causes the rotor of motor 5M to turn at rated speed, 3600 revolutions per minute, after a predetermined time. Motor 5M is a conventional two pole, single-phase synchronous motor having a wound stator and squirrel cage rotor and is described in detail in the aforementioned Bulletin 215B.

*Phase control circuit*

Figure 11:
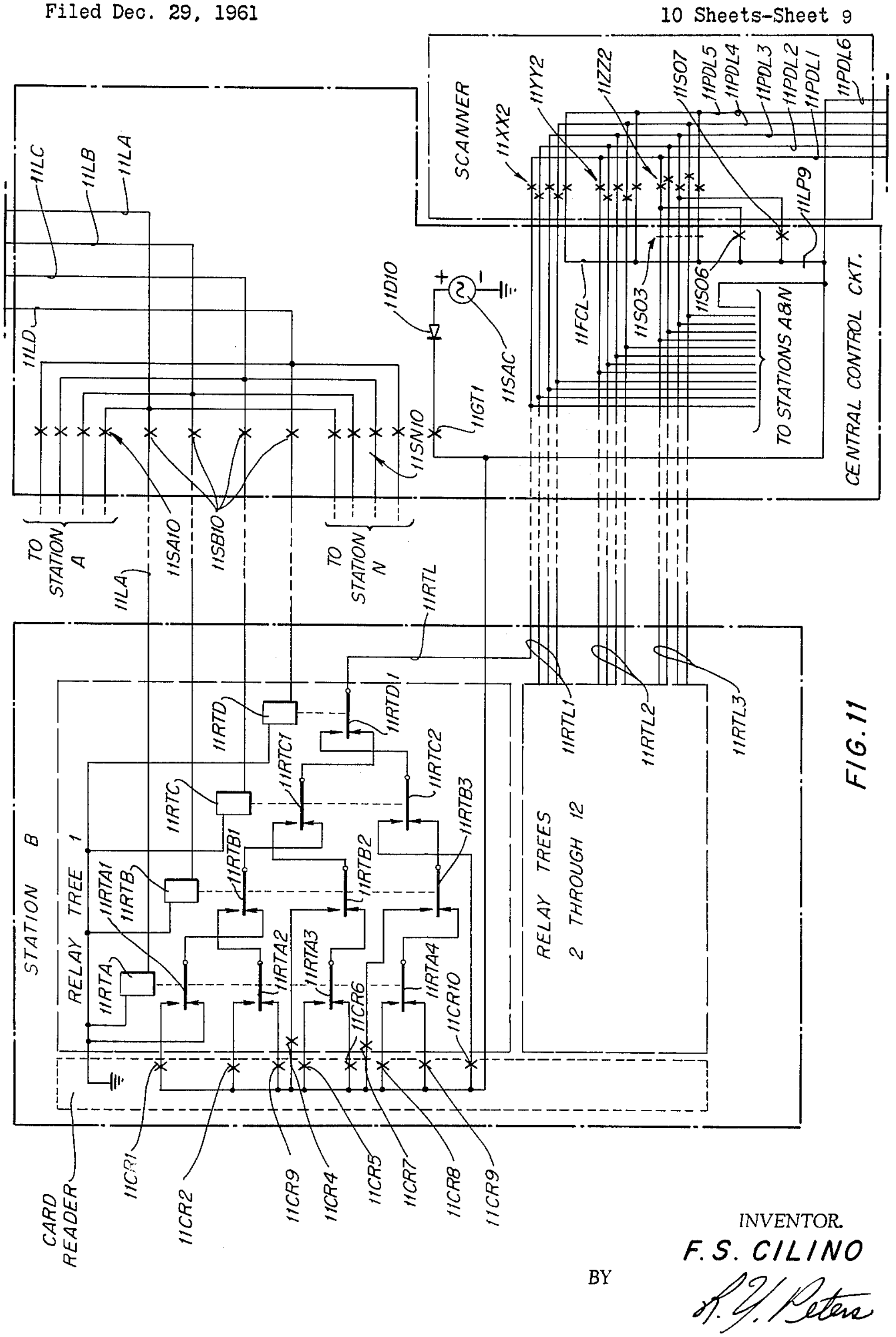
FIG. 11 shows a plurality of relay trees for performing a primary data reduction step and further shows portions of the scanner and central control circuit which cooperatively operate with the relay trees.

Punch motor 5M cooperates with punch magnets 5PM1–5 to operate a plurality of punches 5P1–5 and a tape feeder 5TF to record data from the card inserted in the card reader, FIG. 11, by perforations in a conventional teletypewriter tape. The tape punching device is a standard teletypewriter item (which is shown and described in detail in the aforementioned Bulletin 215B). For purposes of the instant description, the relative dimensions of the tape punching device have often been distorted to more clearly and simply show how it operates with circuitry of the present invention.

Conventional adjustable means for coupling a motor shaft 5MS of punch motor 5M to a punch shaft 5PS are also shown and described in Bulletin 215B. It is assumed that such coupling means are adjusted so that cams 5C1–6 on shaft 5PS engage followers 5F1–6 when punch magnets 5PM1–6 are operated and when arrow 6X on shaft 6MS is pointing downwardly.

Moreover, the punch motor 5M upon reaching rated speed is synchronized to the line alternating current source 5LAC and a line alternating source 6LAC and operates in a specific phase relation to the frequency thereof. Also, the data transmission system is synchronized to a system alternating current source 6SAC which, in turn, is synchronized to the line alternating current source 6LAC through contacts 6PR1 and 6PR2 or through contacts 6PR3 and 6PR4 of phase reversing relay 6PR. Accordingly, the frequencies of both the punch motor 5M and the various components of the data transmission system are in a predetermined phase relationship. However, the punch shaft 5PS and motor shaft 5MS and 6MS can arbitrarily fall into either of two positions upon start-up of motor 5M (arrow 6X pointing downwardly or upwardly) at a given point 7Y, Wave Form 7A of the line alternating current wave form. This is because the rotor of motor 5M locks into step with the driving frequency of sources 5LAC, 6LAC, and 6SAC in one of two mechanical positions, as shown by arrows 6X pointing downwardly or upwardly.

Figure 6:
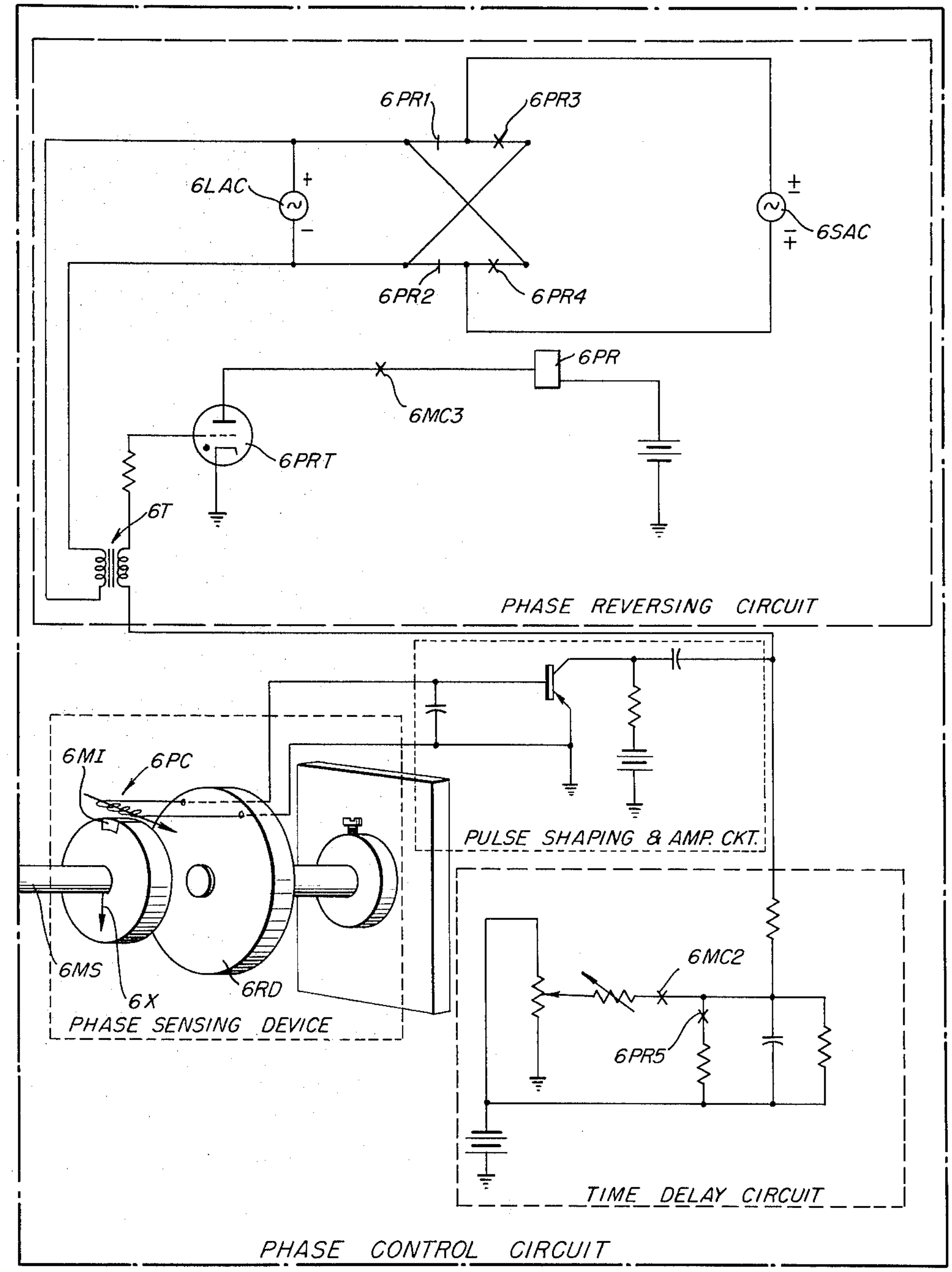
FIG. 6 illustrates a phase-control circuit, which includes a phase reversing circuit, for controlling the phase relationship of the synchronous components of the data transmission and collection system.
Figure 7:
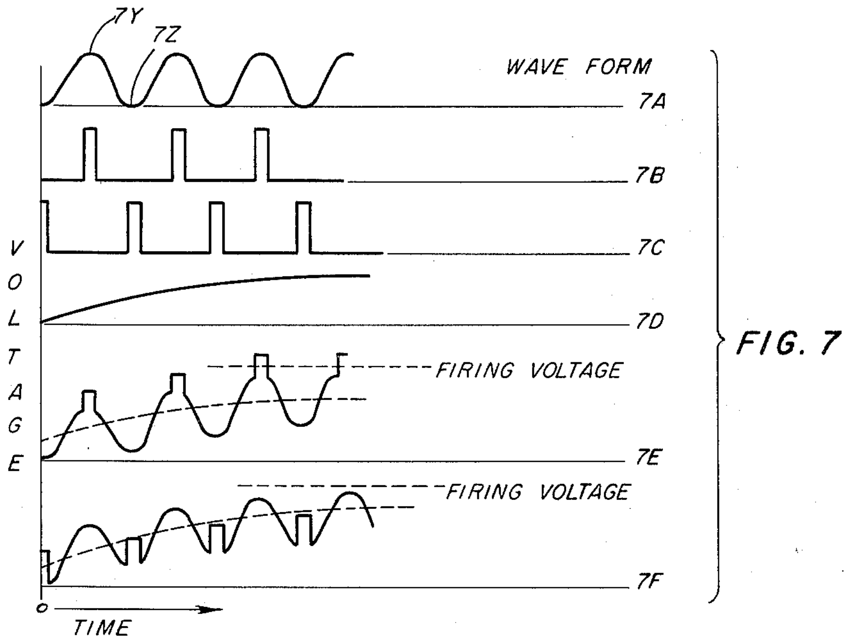
FIG. 7 shows various voltage wave forms of the phase-control circuit.

Since only one (arrow 6X pointing downwardly) of these two positions of motor shaft 5MS, 6MS is useful and either position can occur at each punch motor start-up, the phase control circuit of FIG. 6 was devised. This phase control circuit upon arrow 6X pointing upwardly inverts the polarity of the line alternating current source 6LAC so that the system alternating current 6SAC driving the synchronous components matches the inverted phase of the rotor. Such inversion is accomplished by the operation of the phase reversing relay 6PR. This relay 6PR operates only if the punch shaft 5PS and motor shaft 5MS and 6MS are in the incorrect position, as would be indicated by the arrow 6X pointing upwardly, and does not operate if such shafts 5PS, 5MS and 6MS are in the correct position, as is indicated by the arrow 6X pointing downwardly.

The phase control circuit of FIG. 6 includes a phase sensing device which is shown and described in detail in the aforementioned Bulletin 215B. This phase sensing device utilizes a magnetic pickup coil 6PC and a permanent magnet, not shown (as described in detail in Bulletin 215B) which establishes a magnetic field. Rotation of the motor shaft 6MS passes a magnetic insert 6MI, fixed to shaft 6MS, through the magnetic field. This produces changing magnetic lines of force which induce a voltage pulse in the pickup coil 6PC for every revolution of shaft 6MS. From the coil 6PC this pulse is fed to a conventional shaping and amplifying circuit, the output pulse of which has the general shape shown in Wave Forms 7B and 7C. Such output pulse is fed to the grid of thyratron 6PRT.

Since the pickup coil 6PC is adjustably mounted on a rotatable disk 6RD, the position of such coil 6PC and, therefore, the timing of the output pulse are adjustable. In order that the output pulse, upon correct rotor start-up (arrow 6X pointing downwardly) of motor 5M, coincides with the negative peak 7Z, Wave Form 7A of the line alternating current, the timing of such output pulse is adjusted by rotating the rotatable disk 6RD to adjust the position of coil 6PC. Therefore, when an incorrect rotor start-up occurs (arrow 6X pointing upwardly—180° out of phase with correct rotor start-up) the output pulse coincides with the positive peak 7Y of the line alternating current Wave Form 7A.

In order to better understand precisely how the phase control circuit of FIG. 6 functions, it is first assumed that the rotor of punch motor 5M is in the incorrect starting position; that is, arrow 6X of motor shaft 6MS is pointing upwardly. As previously mentioned, motor 5M is energized by the operation of motor control relay 4MC and the closing of contacts 5MC1. In addition, operation of relay 4MC closes contacts 6MC2 which are connected within a time-delay circuit. The time-delay circuit permits motor 5M to develop rated speed before the phase reversing circuit operates. Upon closure of contacts 6MC2 the negative bias on the grid of thyratron 6PRT changes exponentially in a positive direction, as shown by Wave Form 7D, under the control of the time-delay circuit.

Also, operation of relay 4MC closes the plate circuit of thyratron 6PRT by the closing of contacts 6MC3 so that such thyratron 6PRT is prepared for firing.

Also impressed on the grid of thyratron 6PRT through transformer 6T is the line alternating current from the source 6LAC, shown by Wave Form 7A. Due to the now assumed incorrect rotation position, as exemplified by arrow 6X pointing upwardly, the voltage pulse from the pickup coil 6PC is fed to the pulse shaping and amplifying circuit. The output pulse of such circuit having the shape shown in Wave Form 7B, such pulse is impressed on the grid of thyratron 6PRT. Upon adding all the voltages (Wave Forms 7A, 7B and 7D) appearing on the grid of the thyratron 6PRT, a voltage exemplified by Wave Form 7E crossing the firing or threshold voltage of thyratron 6PRT results. Accordingly, thyratron 6PRT fires and operates phase reversing relay 6PR through a path including ground, thyratron 6PRT, now closed contacts 6MC3 of now operated relay 4MC, winding of relay 6PR to positive battery. Operation of relay 6PR opens normally closed contacts 6PR1 and 6PR2 and closes normally open contacts 6PR3 and 6PR4, thereby reversing the polarity of the system alternating current 6SAC. Thus, the polarity of the system alternating current 6SAC now matches the inverted phase of the punch motor 5M and all components of the transmission and collection system are in the proper phase relationship.

Operation of relay 6PR also closes contacts 6PR5 in the time-delay circuit to restore a high negative bias to the grid of thyratron 6PRT to condition such thyratron 6PRT for refiring after relay 4MC releases and opens the plate circuit of thyratron 6PRT by the opening of contacts 6MC3.

On the other hand, if the rotor of punch motor 5M is in the proper phase or correct start-up position, as shown by arrow 6X pointing downwardly, a pulse shown by Wave Form 7C results at the grid of thyratron 6PRT. Upon adding the voltages (Wave Forms 7A, 7C and 7D) appearing at the grid of thyratron 6PRT, a voltage wave form shown at 7F results. From an examination of Wave Form 7F, it is apparent that the threshold or firing voltage of thyratron 6PRT is never reached. Therefore, thyratron 6PRT is not energized and relay 6PR is not operated. Thus, the line alternating current 6SAC is not reversed since the polarity thereof matches the phase of the punch motor 5M. Accordingly, the line alternating current 6LAC is directed over a path including normally closed contacts 6PR1 and 6PR2 to the system alternating current 6SAC.

It is important to note that the source 6SAC is connected in a definite polarity or phase relationship, shown by appropriate + and − signs, to the synchronous components of the data transmission and collection system. Specifically, system alternating current 5SAC supplying the tape punching device and system alternating current 11SAC of the central control circuit supplying punching pulses to the card reader are both connected in the same phase relationship to source 6SAC. On the contrary, system alternating current 10SAC supplying the grid and plate circuits of a stepping switch thyratron 10S, and system alternating current 9SAC supplying the scanner are both connected to source 6SAC in a phase relationship opposite to that of sources 5SAC and 11SAC. All these connections are shown by appropriate + and − signs.

*Delay-scanner starting circuit*

Figure 8:
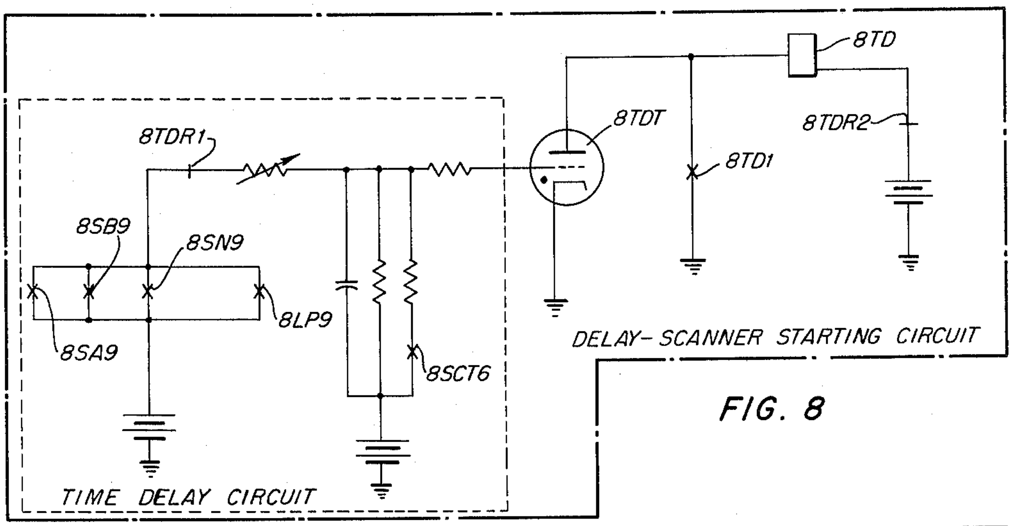
FIG. 8 illustrates a delay-scanner starting circuit for allowing the punching motor of the tape punching device to obtain rated speed and the phase control circuit to operate before the operation of a scanner.
Figure 9:
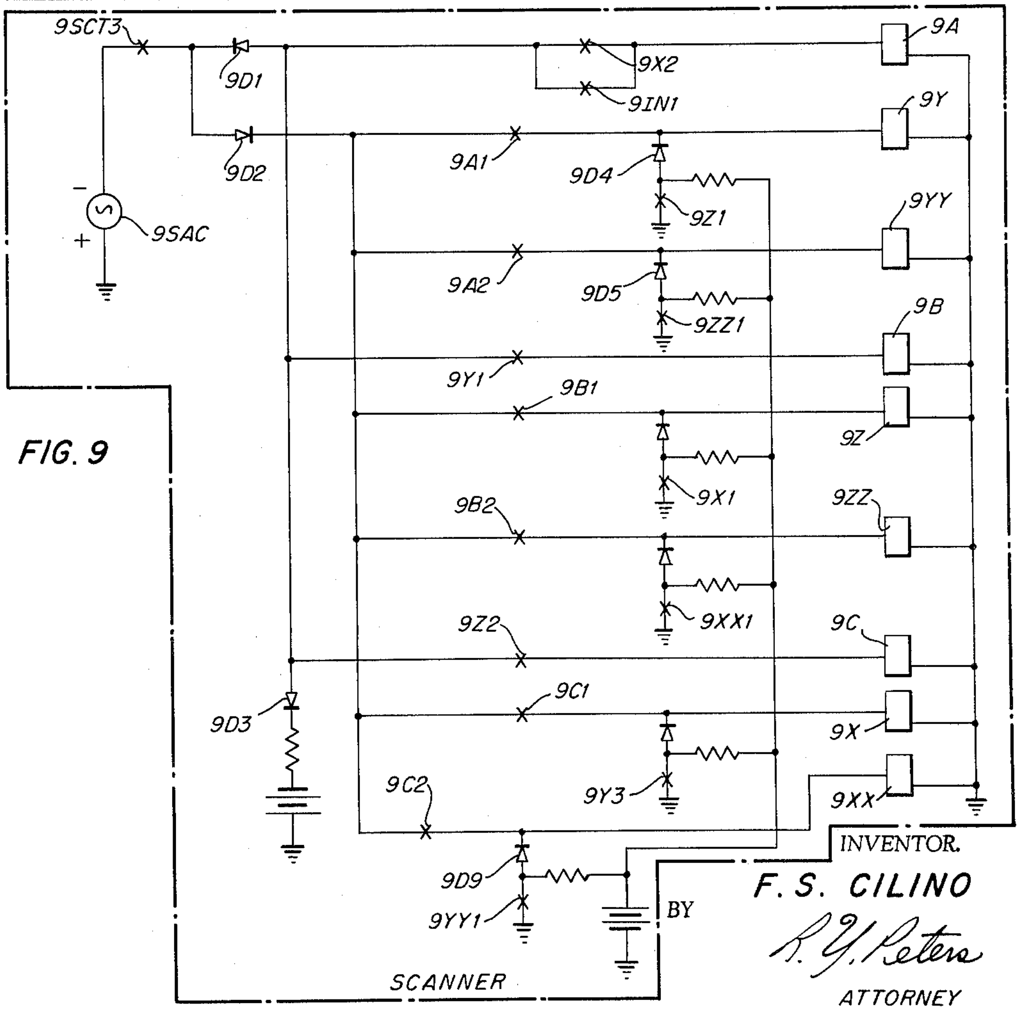
FIG. 9 illustrates a high-speed sixty-cycle scanner for timing the operation of the various components of the data transmission and collection system and for performing a data reduction operation.

Shown in FIG. 8 there is a delay and scanner starting circuit for allowing punch motor 5M to attain rated speed and the phase control circuit of FIG. 6 to operate prior to the operation of the scanner of FIG. 9.

As previously mentioned, station relay 3SB is operated. Operation of relay 3SB closes contacts 8SB9 in a time-delay circuit of the delay and scanner starting circuit, increasing exponentially the bias on the grid of thyratron 8TDT through a path including positive battery, now closed contacts 8SB9, normally closed contacts 8TDR1 of now unoperated time-delay release relay 13TDR, a pair of resistors to the grid of thyratron 8TDT. The various resistors and capacitors of the time-delay circuit are selected such that thyratron 8TDT fires after the punch motor 5M has obtained rated speed and phase control circuit of FIG. 6 has operated.

Upon the firing of thyratron 8TDT, relay 8TD operates through a path including ground, thyratron 8TDT, winding of relay 8TD, normally closed contacts 8TDR2 to positive battery.

Operation of relay 8TD extinguishes thyratron 8TDT by shorting the plate thereof to ground and establishes a locking circuit for such relay 8TD over a path including ground, now closed contacts 8TD1, winding of relay 8TD, normally closed contacts 8TDR2 to positive battery.

Operation of relay 8TD operates scanning control relay 4SCT over a path including positive battery now closed contact 4SB7, now closed contact 4TD2, winding of relay 4SCT, normally closed contacts 4R2 of unoperated release relay 4R to ground.

An initiating relay 4IN has a biasing current directed through the winding thereof over a path including positive battery, resistor, winding of relay 4IN to ground. This biasing current is not sufficient to operate the relay 4IN. However, upon operation of relay 4SCT, a capacitor 4C, which had been charged through normally closed contacts 4SCT1, is discharged through a path including a resistor, now closed contacts 4SCT2, winding of relay 4IN to ground. Such discharge of the capacitor 4C delivers a pulse of sufficient energy to operate relay 4IN. Upon operation of relay 4IN, the biasing current maintains such relay operated. Operation of relay 4IN initiates the operation of a sixty-cycle high-speed scanner, FIG. 9.

Figure 10:
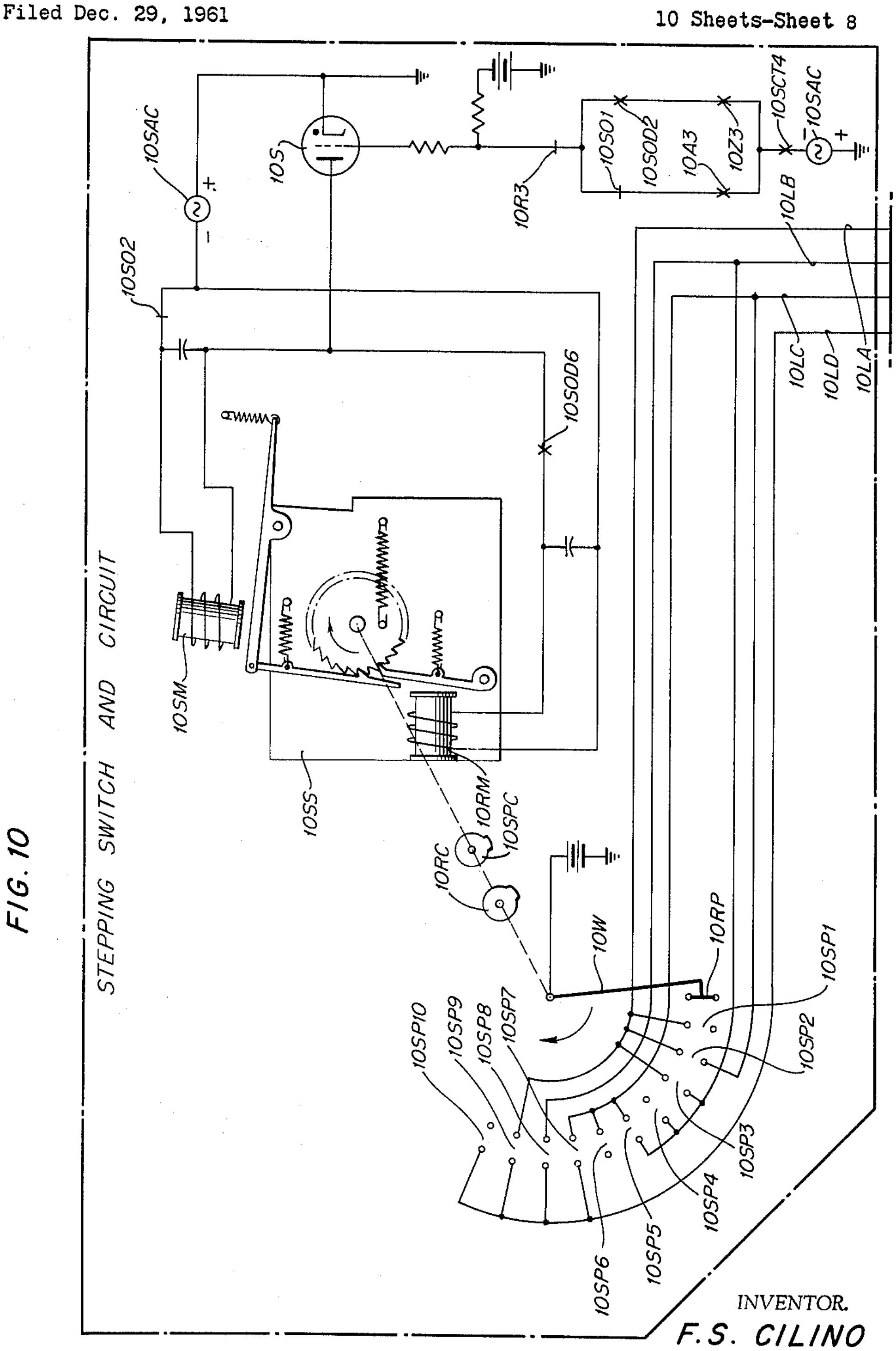
FIG. 10 illustrates a stepping switch and circuit for operating a plurality of relay trees.

Operation of relay 4SCT also closes contacts 9SCT3 and 10SCT4 which condition both the scanner of FIG. 9 and stepping switch and circuit of FIG. 10, for operation by connecting respectively the system alternating current 9SAC and 10SAC thereto.

Operation of relay 4SCT also closes contacts 4SCT5 to complete a holding circuit for such relay 4SCT.

Moreover, operation of relay 4SCT closes contacts 8SCT6 to discharge the timing capacitor of the grid time-delay circuit to recondition thyratron 8TDT for refiring.

*Scanner*

The scanner, FIG. 9, which operates under the control of the sixty-cycle system alternating current 9SAC, times the primary scanning operation of the relay trees of FIG. 11 and performs a secondary scanning operation.

Operation of initiating relay 4IN by relay 4SCT starts the operation of the scanner upon the first negative half of the cycle of the source 9SAC by short circuiting contacts 9X2 and operating relay 9A over a path including ground, source 9SAC, now closed contacts 9SCT3, diode 9D1, now closed contacts 9IN1, winding of relay 9A to ground. If the short provided by contacts 9IN1 across normally open contacts 9X2 occurs too late in the cycle, that is, occurs too late in the negative half of the cycle or occurs during a positive half of the cycle, due to the diode 9D1 relay 9A waits until the occurrence of the next negative half of the cycle and then operates. Such waiting is necessitated for a period of only 1/120 second.

Upon the operation of relay 9A, such relay is held operated by a biasing current provided over a path including negative battery, resistor, diode 9D3, now closed contacts 9IN1, winding of relay 9A to ground.

Operation of relay 9A operates relays 9Y and 9YY upon the occurrence of the positive half cycle. The operating path for relay 9Y may be traced from ground, source 9SAC, now closed contacts 9SCT3, diode 9D2, now closed contacts 9A1, winding of relay 9Y to ground. A similar circuit may be traced for the operation of relay 9YY. Relay 9Y is held operated by a biasing current provided over a path including positive battery, resistor, diode 9D4, winding of relay 9Y to ground. A similar holding path may be traced for relay 9YY.

Operation of relay 9Y results in the release of relay 4IN by short circuiting the biasing current therefor over a path including ground, now closed contacts 4Y2, winding of relay 4IN to ground. Thus, the operating path of relay 9A is opened by the opening of contacts 9IN1, thereby releasing such relay 9A.

Also, operation of relay 9Y operates relay 9B upon the occurrence of the next negative half cycle over a path including ground, source 9SAC, now closed contacts 9SCT3, diode 9D1, now closed contacts 9Y1, winding of relay 9B to ground. Relay 9B is maintained operated by a holding current similar to that which maintained relay 9A operated.

Operation of relay 9B results in the operation of relays 9Z and 9ZZ upon the occurrence of the next positive half cycle. A path for the operation of relay 9Z may be traced from ground, source 9SAC, now closed contacts 9SCT3, diode 9D2, now closed contacts 9B1, winding of relay 9Z to ground. A similar operating path may be traced for relay 9ZZ. In the same manner that relays 9Y and 9YY were maintained operated by a biasing current, so also relays 9Z and 9ZZ are maintained operated by a similar biasing current.

Operation of relays 9Z and 9ZZ releases relays 9Y and 9YY respectively by short circuiting the biasing current thereto. Such biasing current is short circuited over a path including positive battery, resistor, now closed contacts 9Z1 to ground. A similar short circuiting path may be traced for relay 9YY. Furthermore, release of relay 9Y results in the release of relay 9B by opening contacts 9Y1 which open the biasing circuit of the winding of relay 9B.

Operation of relay 9Z operates relay 9C upon the next negative half cycle over a path including ground, source 9SAC, now closed contacts 9SCT3, diode 9D1, now closed contacts 9Z2, winding of relay 9C to ground. Relay 9C is maintained operated by a biasing current similar to that which maintained relay 9A operated.

Then, relay 9C operates relays 9X and 9XX on the next positive half cycle. The operating path for relay 9X may be traced from ground, source 9SAC, now closed contacts 9SCT3, diode 9D2, now closed contacts 9C1, winding of relay 9X to ground. A similar operating path may be traced for relay 9XX. In the same manner that relays 9Y and 9YY were maintained operated by a biasing current so also relays 9X and 9XX are maintained operated by a similar biasing current.

Operation of relays 9X and 9XX result in the release of relays 9Z and 9ZZ in a manner similar to that in which relays 9Z and 9ZZ resulted in the release of relays 9Y and 9YY.

Operation of relay 9X operates relay 9A by the closure of contacts 9X2. Operation of relay 9A starts another cycle of operation of the scanner.

In summary, the sequence of operation of the relays of the scanner is shown diagrammatically in FIG. 12 and is as follows: relays 9A; 9Y, 9YY; 9B; 9Z, 9ZZ; 9C; 9X, 9XX; 9A; etc. Each of the pairs of relays 9Y, 9YY; 9Z, 9ZZ; and 9X, 9XX are maintained operated until the subsequent pairs of relays operate, thereby effectuating a scanning action in which the steps overlap slightly, as clearly shown in FIG. 12.

*Stepping switch and circuit*

The scanner of FIG. 9 operates the stepping switch and circuit of FIG. 10 by controlling the firing of a stepping switch thyratron 10S connected in the stepping circuit.

Upon the first operation of relay 9A following the closure of contacts 9IN1 and the occurrence of the first negative half cycle of the source 9SAC, the grid of thyratron 10S is connected to the source 10SAC, which is, of course, in phase, as shown by polarity signs, with the source 9SAC supplying the scanner. The path connecting the source 10SAC to the grid of thyratron 10S may be traced from ground, source 10SAC, now closed contacts 10SCT4 of now operated scanning control relay 4SCT, now closed contacts 10A3, normally closed contacts 10SO1 of unoperated shutoff relay 4SO, normally closed contacts 10R3 of unoperated release relay 4R to the grid of thyratron 10S.

Upon the occurrence of the next positive half cycle following the first negative half cycle, thyratron 10S fires. This firing is caused by the occurrence of the positive half cycle at both the grid and the plate of thyratron 10S.

Figure 12:
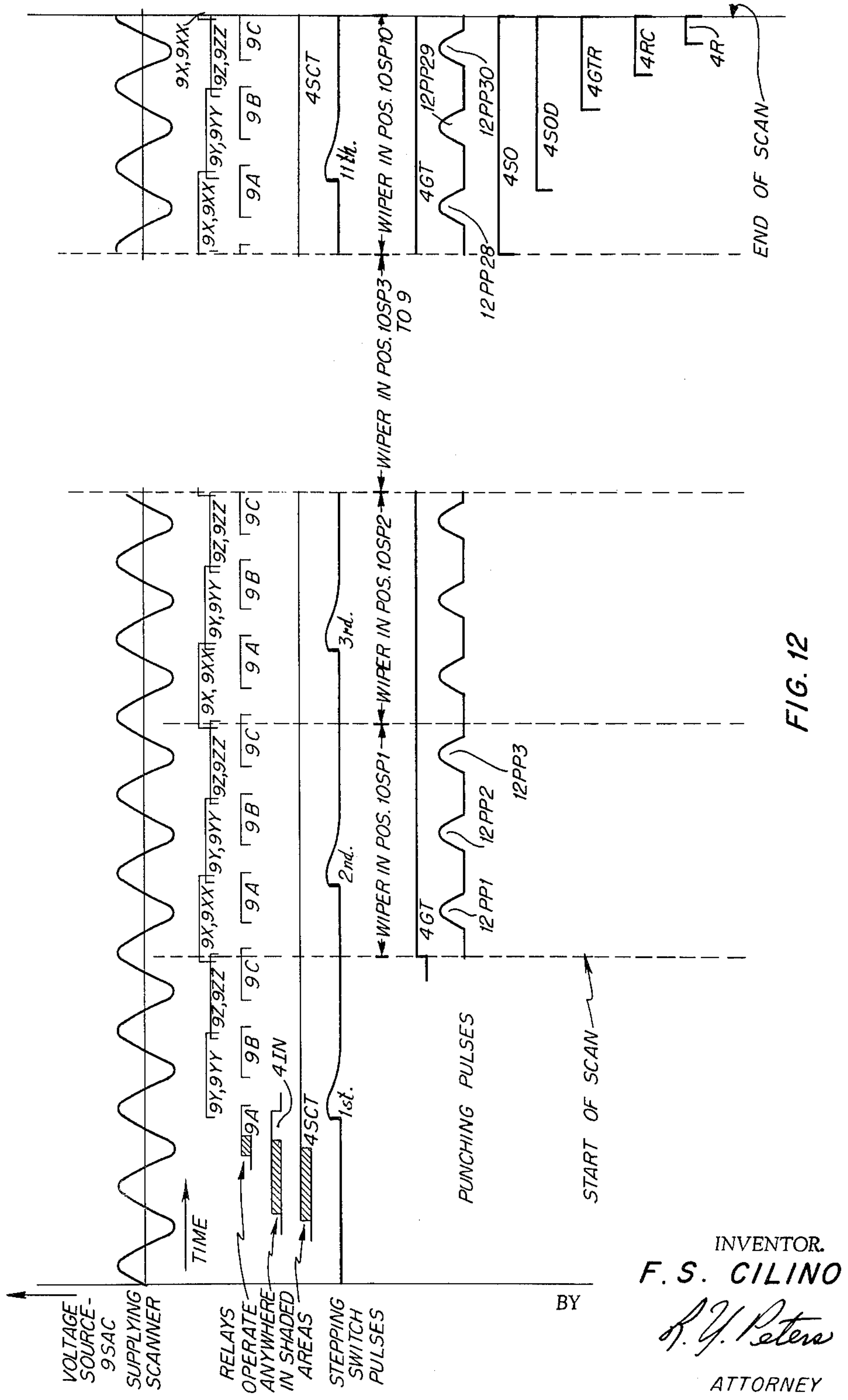
FIG. 12 shows a timing chart for several of the components of the scanner, central control circuit and stepping switch and circuit.

Upon the firing of thyratron 10S, a first pulse of current, shown in FIG. 12, energizes stepping magnet 10SM of stepping switch 10SS through normally closed contacts 10SO2 of unoperated shutoff relay 4SO. The energy of the pulse is stretched by a capacitor connected across magnet 10SM so that such pulse is capable of energizing magnet 10SM a sufficient amount to attract the armature of the stepping switch 10SS.

Movement of the armature advances wiper 10W from a rest position 10RP to a first selector position 10SP1.

Thyratron 10S is extinguished upon the occurrence of the next negative half cycle of the source 10SAC by reversing of the plate supply of thyratron 10S. Extinguishment of thyratron 10S opens the energizing path of stepping magnet 10SM causing a delayed release of the armature which is returned to its unoperated condition by a spring.

Also, upon the occurrence of the next negative half cycle, relay 9A is released (as explained in the description of the scanner) and contacts 10A3 are opened, thereby opening the grid circuit of thyratron 10S.

The thyratron 10S receives its next triggering pulse when relay 9A again operates on the next cycle of the high-speed scanner. Thus, the wiper 10W of the stepping switch 10SS is stepped once for every scanner cycle or every twentieth of a second. The operation of the stepping switch 10SS and the scanner is clearly shown by a conventional operating chart, FIG. 12.

While wiper 10W of the stepping switch 10SS is in position 10SP1, contacts 4SPC1 are closed by a cam 10SPC to condition gate relay 4GT for operation upon the subsequent operation of relay 9X. Upon this operation of relay 9X, relay 4GT is operated over a path including positive battery, now closed contacts 4SPC1, normally closed contacts 4SOD1 of unoperated shutoff delay relay 4SOD, now closed contacts 4X3, winding of relay 4GT to ground.

Furthermore, once relay 4GT is operated, it is maintained operated during the transmission of data by biasing current, the circuit of which may be traced from positive battery, now closed contacts 4SCT7 of now operated scanning control relay 4SCT, resistor, winding of relay 4GT to ground.

Operation of relay 4GT closes contacts 11GT1 to connect a plurality of sequential punch pulses from source 11SAC to the card reader.

*Card reader*

The card reader (shown diagrammatically in FIG. 11) is of the conventional type having a plurality of normally open contacts. As used in this particular embodiment, the card reader has twelve groups of ten normally open contacts or one hundred and twenty normally open contacts. Such normally open contacts are shown in FIG. 11.

Upon insertion of the card having data formulated thereon into the card reader of station B, these normally open contacts associated with the card reader are selectively closed. Thus, a condition of closed and open contacts exists in the card reader after insertion of the card therein.

Each of the twelve groups of ten normally open contacts are associated with a relay tree of FIG. 11.

*Relay trees*

The relay trees are of the conventional type of the prior art and are used in conjunction with the stepping switch 10SS as a primary scanner to convert a plurality of parallel signals or bits of data down to a predetermined number of parallel signals having a predetermined number of serial bits.

As mentioned previously, there is one relay tree associated with each of the 12 groups of 10 contacts. Hence, there are twelve relay trees which are numbered from 1 through 12. Since the contact arrangements of the relay trees are identical, only one relay tree, relay tree 1, is shown in detail in FIG. 11.

Also, as previously mentioned, operation of station relay 3SB closes four sets of contacts 11SB10 to connect four scanning control leads 11LA, 11LB, 11LC and 11LD of the stepping switch 10SS to relay trees 1–12 of station B.

Upon the movement of wiper 10W of stepping switch 10SS to position 10SP1 relay 11RTA operates. The operating path for relay 11RTA may be traced from positive battery, wiper 10W, contacts 10SP1, leads 10LA and 11LA, now closed contacts 11SB10, winding of relay 11RTA to ground.

Operation of relay 11RTA pulls its associated contacts of relay trees 1–12 upwardly. More particularly, referring to relay tree 1, contacts 11RTA1–4 are pulled upwardly. Thus, the condition of card reader contacts 11CR1 are scanned by the cooperative action of the stepping switch 10SS and relay tree 1 when wiper 10W is in position 10SP1. Specifically, if contacts 11CR1 have been closed by the card, a circuit is completed from ground, source 11SAC, diode 11D10, now closed contacts 11GT1 of now operated gate relay 4GT, now closed contacts 11CR1, now closed contacts 11RTA1, unoperated contacts 11RTB1 of unoperated relay 11RTB, unoperated contacts 11RTC1 of unoperated relay 11RTC, unoperated contacts 11RTD1 of unoperated relay 11RTD to relay tree lead 11RTL. Thus, if contacts 11CR1 are closed a punching pulse 12PP1, coincident with the positive peak of source 11SAC is directed over line 11RTL, while if contacts 11CR1 are not closed, no pulse appears on line 11RTL.

In the same manner that card reader contacts 11CR1 associated with relay tree 1 are scanned by the cooperative action of relay tree 1 and stepping switch 10SS when wiper 10W is in position 10SP1, so also all the other card reader contacts 11CR1 (not shown in detail) of relay trees 2–12 are scanned. Further, the other contacts 11CR2–10 of relay trees 1–12 are similarly scanned by the cooperative action of the stepping switch 10SS and the relay trees 1–12 when wiper 10W is in positions 10SP2–10.

If any of the card reader contacts 11CR1–10 of relay trees 1–12 are closed while wiper 10W is in positions 10SP1–10, punching pulses representing bits of data are directed over twelve relay tree leads 11RTL. In other words, data from the card reader in the form of one hundred and twenty parallel bits are converted into twelve parallel signals each of ten serial bits on the twelve leads 11RTL. These twelve leads 11RTL are divided in three groups of four leads each, designated 11RTL1–3, and each group 11RTL1–3 is under the control of the scanner. More particularly, four sets of contacts 11XX2 are connected in series with the first group of leads 11RTL1, while four sets of contacts 11YY2 are connected in series with the second group of leads 11RTL2, and four sets of contacts 11ZZ2 are connected in series with the third group of leads 11RTL3.

A format control lead 11FCL associated with each group of leads 11RTL1–3 is also under the control of the scanner, and more particularly, under the control of contacts 11XX2, 11YY2 and 11ZZ2.

Figure 5:
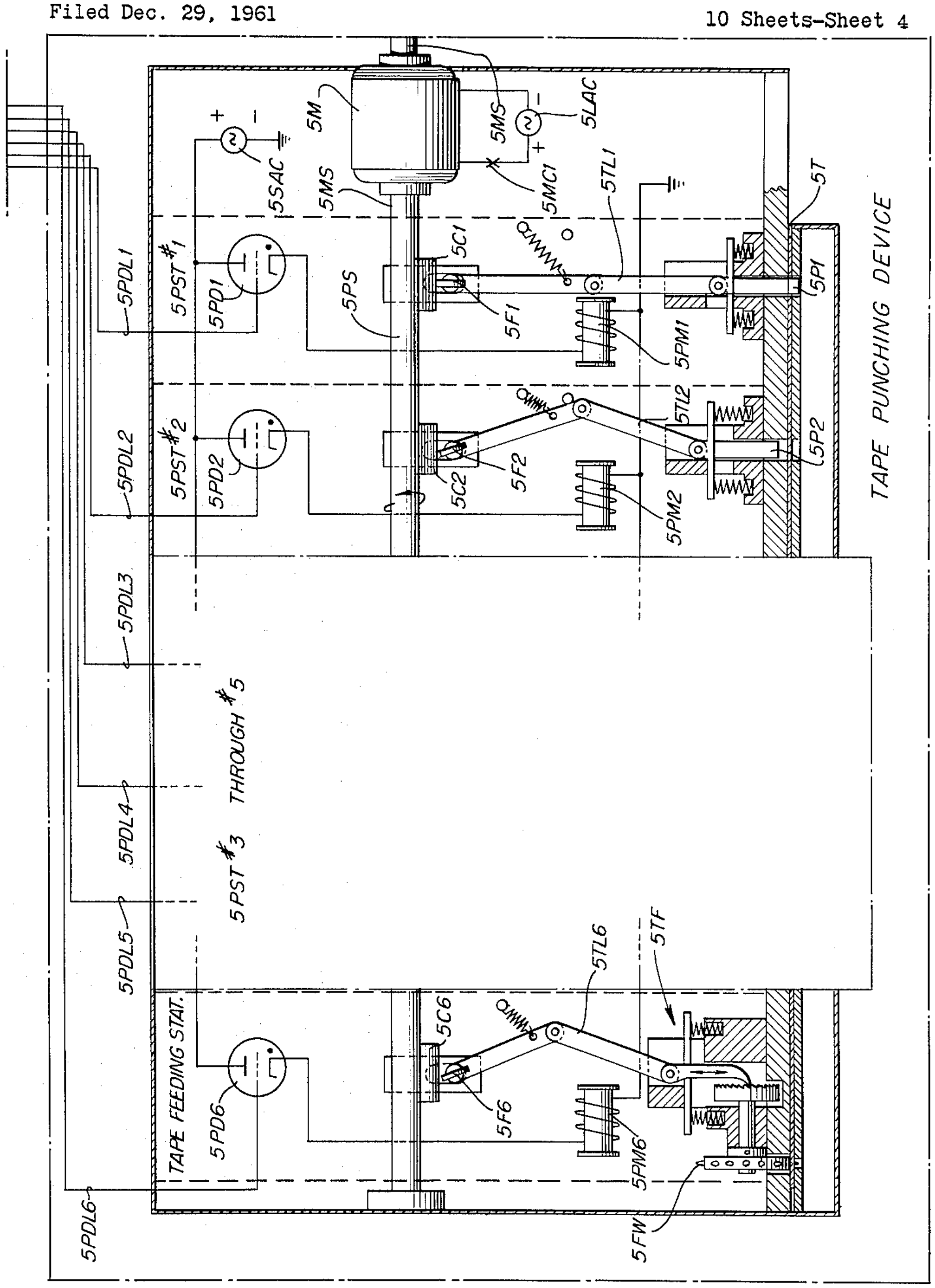
FIG. 5 is a circuit diagram of a tape punching device for recording data on tape.

As shown diagrammatically in FIG. 12, upon the operation of relay 9XX of the scanner, if the card reader contacts 11CR1 of relay tree 1–4 are closed, four punching pulses 12PP1 (only one of which is shown in FIG. 12) from relay trees 1 through 4 are transmitted over the four leads 11RTL1 to the closed four sets of contacts 11XX2 to the four punching device leads 11PDL1–4 to the punching device of FIG. 5 to record a column of perforations on tape in accordance with the closed condition of card reader contacts. On the other hand, if the card reader contacts 11CR1 are open, no pulses 12PP1 are transmitted, and no perforations made in the tape. Thus, bits of data are recorded on the tape by the presence or absence of perforations.

Next, upon the operation of relay 9YY of the scanner, the four sets of contacts 11YY2 are closed and the four sets of contacts 11XX2 are opened so that punching pulses 12PP2 from relay trees 5–8 are fed over four leads 11RTL2 to the closed four sets of contacts 11YY2 to the punching device leads 11PDL1–4 in accordance with the condition of contacts 11CR1 of relay trees 5–8.

Then relay 9ZZ operates to close the four sets of contacts 11ZZ2 and open the four sets of contacts 11YY2 so that punching pulses 12PP3 are fed from relay trees 9–12, normally closed contacts 11SO3 of unoperated shutoff relay 4SO, four sets of now closed contacts 11ZZ2 to the punching device leads 11PDL1–4 in accordance with the condition of contacts 11CR1 of relay trees 9–12. Thus, three columns each of four bits of data are transmitted to the leads 11PDL1–4 and recorded on tape while the wiper 10W of the stepping switch 10SS is in position 10SP1. The same procedure is followed for the other nine positions 10SP2–10 so that a total of thirty columns of four bits each of data is recorded by the punching device on the tape. In summary, data in the form of twelve parallel signals each of ten serial bits on twelve leads 11RTL1–3 are converted by the scanner, in the accomplishment of a secondary scanning operation, into four parallel signals each of thirty serial bits on leads 11PDL1–4 and recorded on tape.

Punching device lead 11PDL5 is connected to the format control leads 11FCL and is selectively connected by normally closed contacts 11LP9 of unoperated leader punching relay 3LP to the punching pulse source 11SAC so that when leader is being punched, no perforations are made in the fifth row of the tape. In this manner, tape leader is indicated.

Punching device lead 11PDL6 is connected through now closed contacts 11GT1 and diode 11D10 to the source 11SAC so as to be provided with a constant series of punching pulses which are directed over lead 5PDL6 to the punching device of FIG. 5 where they are used to operate a tape feeding station.

*Punching device*

There is shown in FIG. 5 a conventional high-speed tape punching device to which the punching pulses are fed from leads 11PDL1–6 to leads 5PDL1–6. (This tape punching device is shown and described in detail in Bulletins 215B and 1154B, Technical Manual High Speed Tape Punch Set [BRPE], published by Teletype Corporation, 1960.) As mentioned previously, for purposes of the instant description the relative dimensions of the tape punching device have often been distorted and some component parts omitted to more clearly and simply show how it operates with the circuitry of the present invention.

The punching pulses from leads 5PDL1–4 selectively fire punching device thyratrons 5PD1–4 to actuate punches 5P1–4, thereby recording data from the card reader on tape 5T in the form of perforations. Punching pulses from leads 11FCL, 11PDL5 and 5PDL5 fire punching device thyratron 5PD5 for the transmission of the first twenty-nine digits and do not fire such thyratron 5PD5 or punch a hole on the thirtieth digit, as explained below. The punching pulses from leads 11PDL6, 5PDL6 cyclically fire thyratron 5PD6 to intermittently advance the tape 5T.

More particularly, upon each rotation of punch shaft 5PS of motor 5M, cams 5C1–6 fixed to such punch shaft 5PS buckle toggle links 5TL1–6 if the associated punching magnets 5PM1–6 are not energized. Since the punching pulses produced by source 11SAC, as shown diagrammatically in FIG. 12, are positive and appear at the grid of thyratrons 5PD1–6, and since pulses produced by source 5SAC are of the same polarity as those of source 11SAC and appear at the plate of these thyratrons 5PD1–6, such thyratrons fire upon the occurrence of punching pulses at their grids. Upon the firing of the thyratrons 5PD1–6 the associated punching magnets 5PM1–6 are energized to attract the toggle links 5TL1–6. At punching station 5PST #1, for example, upon the attraction by magnet 5PM1 of the toggle link 5TL1, such link 5TL1 is prevented from buckling and cam 5C1, forces punch 5P1 downwardly to perforate the tape 5T.

As to the tape feeding station, upon the firing of thyratron 5PD6 by a punching pulse at the grid thereof, and a pulse from source 5SAC at the plate thereof, magnet 5PM6 is energized to attract the toggle linkage 5TL6 which is forced downwardly by cam 5C6. This force reciprocates a pawl to intermittently move a coacting ratchet. The ratchet intermittently moves a feeding wheel 5FW to advance the tape 5T.

*Delay-stopping circuit*

Figure 13:
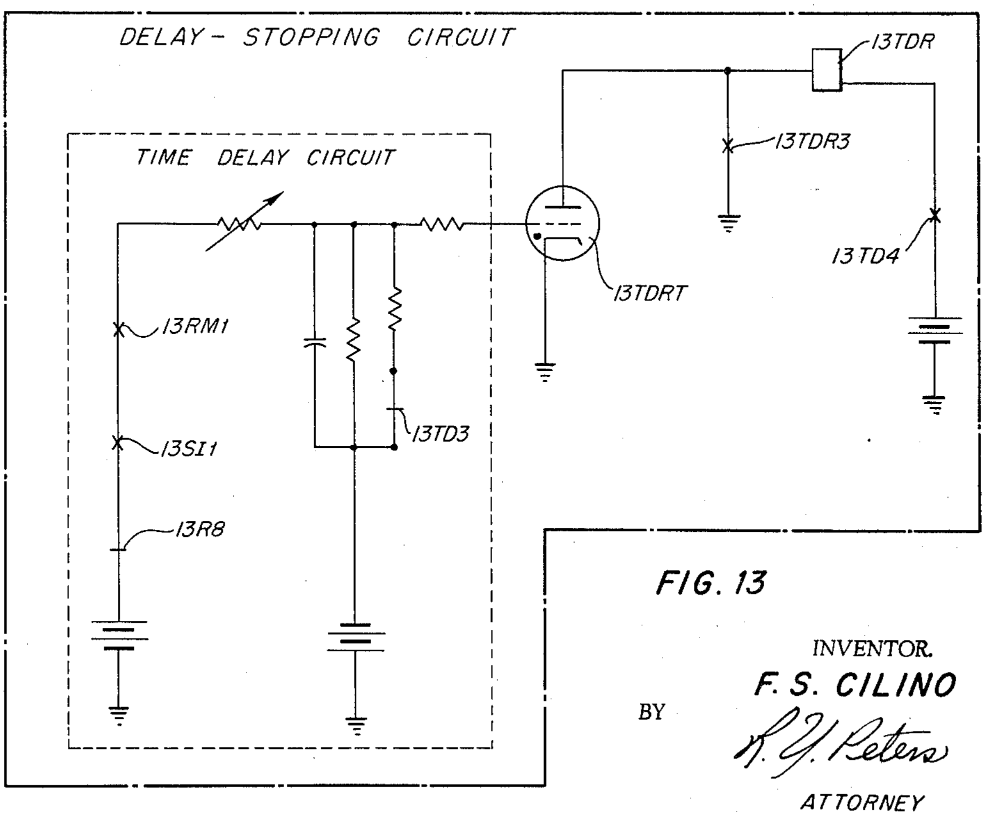
FIG. 13 shows a delay-stopping circuit for de-energizing the entire data transmission and collection system a predetermined time after the transmission and collection of data from a data station.

There is shown in FIG. 13 a delay-stopping circuit for releasing the various relays of the transmission and collection system and de-energizing the punching motor 5M a predetermined time after the transmission and collection of the last bit of data from the card reader. By so de-energizing the motor 5M a predetermined time after the last transmission of a bit, such motor 5M is not de-energized needlessly thereby preventing unnecessary delays associated with motor start-up if there is another station waiting to transmit.

The delay-stopping circuit is initiated by the stepping switch 10SS. More particularly, upon the movement of wiper 10W to position 10SP10, contacts 4SPC10 are closed by the cam 10SPC to operate shutoff relay 4SO over a path including positive battery, now closed contacts 4SPC10, winding of relay 4SO, normally closed contacts 4R4 of release relay 4R to ground.

Operation of relay 4SO establishes a holding circuit therefor through now closed contacts 4SO4 which shunt contacts 4SPC10.

Operation of relay 4SO opens contacts 11SO3 to disconnect the last group of four data leads 11RTL3 and the format control lead 11FCL to punch a special code on the tape which separates blocks of data. To punch this special code, relay 4SO closes contacts 11SO6 and 11SO7 to connect the source 11SAC to the leads 11PDL1 and 11PDL3 to punch the special code on the thirtieth digit. This code is a "one and three level hole" and an "absence of a five level hole" on the thirtieth digit.

Additionally, the operation of relay 4SO opens contacts 10SO1 and 10SO2 to open the grid and plate circuits respectively of thyratron 10S.

Operation of relay 4SO also operates shutoff delay relay 4SOD over a path including positive battery, now closed contacts 4SO5, winding of relay 4SOD to ground. These relays 4SO and 4SOD provide timing control of the delay-stopping circuit.

Operation of relay 4SOD closes contacts 10SOD6 to connect reset magnet 10RM into the plate circuit of thyratron 10S and closes contacts 10SOD2 in the grid circuit so that the firing of thyratron 10S is under the control of contacts 10Z3 of the scanner of FIG. 9.

Operation of relay 4SOD places a holding current on gate release relay 4GTR over a path including positive battery, now closed contacts 4SOD3, resistor, winding of relay 4GTR, normally closed contacts 4R5 of release relay 4R to ground. This holding current is insufficient to operate relay 4GTR but only holds relay 4GTR operated once it has been energized.

Upon the next operation of relay 9Z of the scanner, relay 4GTR is operated over a path including positive battery, now closed contacts 4SOD3, now closed contacts 4Z4, winding of relay 4GTR, normally closed contacts 4R5 to ground. Upon the subsequent opening of contacts 4Z4 relay 4GTR is held operated by the aforementioned holding path.

Operation of relay 4GTR closes contacts 4GTR1 and conditions gate relay 4GT for release when relay 9X of the scanner next operates.

Upon the next operation of relay 9X the holding current for relay 4GT is short circuited to ground causing the release of relay 4GT. The release of relay 4GT and the opening of contacts 11GT1 occurs early enough so that no punching can occur on the last operation of relay 9X. Thus, the transmission is always terminated upon the occurrence of the thirtieth digit.

While the wiper 10W is in position 10SP10, the operation of relay 9Z of the scanner connects the source 10SAC to the grid of thyratron 10S to fire such thyratron upon the occurrence of the next positive pulse of source 10SAC at the grid and plate of thyratron 10S. Upon the firing of thyratron 10S the reset magnet 10RM is energized through now closed contacts 10SOD6.

Energization of magnet 10RM resets switch 10SS by quickly moving wiper 10W from position 10SP10 past the other nine positions to rest position 10RP. Such quick movement produces short pulses of current which are incapable of operating the relays of the relay trees and punching device. However, to insure against the operation of the punching device during reset, normally closed contacts 4SOD1 of the shutoff delay relay 4SOD are placed in series with the operating circuit of gate relay 4GT.

Upon the movement of the wiper 10W to rest position 10RP, a cam 10RC closes contacts 4RC1 to operate release relay 4R over a path including positive battery, now closed contacts 4RC1, now closed contacts 4SOD4, winding of relay 4R to ground.

Operation of relay 4R:

(1) Establishes a holding path for such relay 4R by the closure of contacts 4R6 under the control of station relay 3SB, scanning control relay 4SCT and shutoff delay relay 4SOD;

(2) Operates release memory relay 4RM over a path including positive battery, now closed contacts 4R7, winding of relay 4RM to ground;

(3) Releases relay 3SB by the opening of normally closed contacts 3R1 in series with the holding path thereof;

(4) Releases relay 4SCT by the opening of normally closed contacts 4R2 in series with the holding path thereof;

(5) Opens the grid circuit of thyratron 10S by the opening of contacts 10R3;

(6) Releases relay 4SO by the opening of normally closed contacts 4R4 in series with the holding path thereof;

(7) Releases relay 4GTR by the opening of normally closed contacts 4R5 serially connected within the operating path thereof.

Release of relay 4SO releases relay 4SOD by the opening of contacts 4SO5 connected in series with the holding path thereof.

Release of relays 3SB, 4SCT and 4SOD releases relay 4R by the opening of contacts 4SB8, 4SCT8 and 4SOD4–5. However, release of relay 4R has no effect on relay 4RM since a holding circuit is established by now closed contacts 4TD5 of now operated relay 8TD. After the operation and release of relay 4R, the relays of station B are in their normal or unoperated condition; the data transmission and collection system is again prepared to transmit and collect data from another station. More particularly, if another station, for example station N, having a hold relay 3HN locked in operation is waiting to transmit data from its card reader, the data transmission and collection system is prepared to so transmit and collect such data. In this event, due to the unoperated condition of time-delay release relay 13TDR of the delay-stopping circuit, the punch motor 5M of the tape punching device, the phase control circuit, and the delay-scanner starting circuit remain in their operated condition.

On the other hand, if no station is waiting to transmit or if no station starts to transmit during a predetermined timing cycle of a time-delay circuit of the delay-stopping circuit, the punch motor 5M, the phase control circuit, and the delay-scanner starting circuit are de-energized so that the data transmission and collection system does not unnecessarily produce wear on the components thereof, especially the tape punching device, and does not needlessly use electrical energy.

More particularly, if no station is transmitting or waiting to transmit, system idle relay 3SI operates to connect a positive voltage to the grid circuit of time-delay release thyratron 13TDRT over a path including positive battery, normally closed contacts 13R8 of unoperated relay 4R, now closed contacts 13SI1, now closed contacts 13RM1 of now operated relay 4RM, potentiometer, resistor to the grid of tube 13TDRT. Moreover, if after the timing cycle has commenced, no station starts to transmit so as to release relay 3SI, the timing cycle continues to increase the voltage at the grid of thyratron 13TDRT. Additionally, time-delay relay 8TD is still in an operated condition; therefore, normally closed contacts 13TD3 are opened. Thus, the capacitor 13C of the time-delay circuit is allowed to charge. Consequently, after a predetermined period of time the grid of thyratron 13TDRT becomes sufficiently positive to fire such thyratron 13TDRT.

Firing of thyratron 13TDRT operates time-delay release relay 13TDR over a path including ground, thyratron 13TDRT, winding of relay 13TDR, now closed contacts 13TDR of now operated relay 8TD to positive battery.

Operation of relay 13TDR:

(1) Establishes a holding path for such relay 13TDR under the control of contacts 13TD4 of now operated relay 8TD over a path including now closed contacts 13TDR3, winding of relay 13TDR, now closed contacts 13TD4 to positive battery;

(2) Releases relay 8TD of the delay-scanner starting circuit by the opening or normally closed contacts 8TDR2 in series with the holding path thereof;

(3) Opens contacts 8TDR1 in the grid circuit of thyratron 8TDT so that the time-delay circuit cannot start another timing cycle by a subsequent operation of one of the station relays until relay 13TDR eventually releases.

Release of relay 8TD:

(1) Releases motor control relay 4MC by the opening of contacts 4TD5 in series with the operating path thereof;

(2) Releases relay 13TDR by the opening of contacts 13TD4 in series with the holding path thereof;

(3) Discharges the timing capacitor 13C in the grid circuit of thyratron 13TDRT by the closing of contacts 13TD3 to recondition such thyratron for refiring.

Release of motor control relay 4MC opens the plate circuit of the phase reversing thyratron 6PRT and releases relay 6PR (if it has been operated) by the opening of contacts 6MC3. Release of relay 4MC also opens contacts 5MC1 to de-energize punch motor 5M.

Thus, the data transmission and collection system is de-energized. If it is again desired to transmit and collect data by the insertion of a data card in a card reader at a remote station, the above-described operation re-occurs to transmit and collect such data.

*Leader punching circuit*

Figure 3:
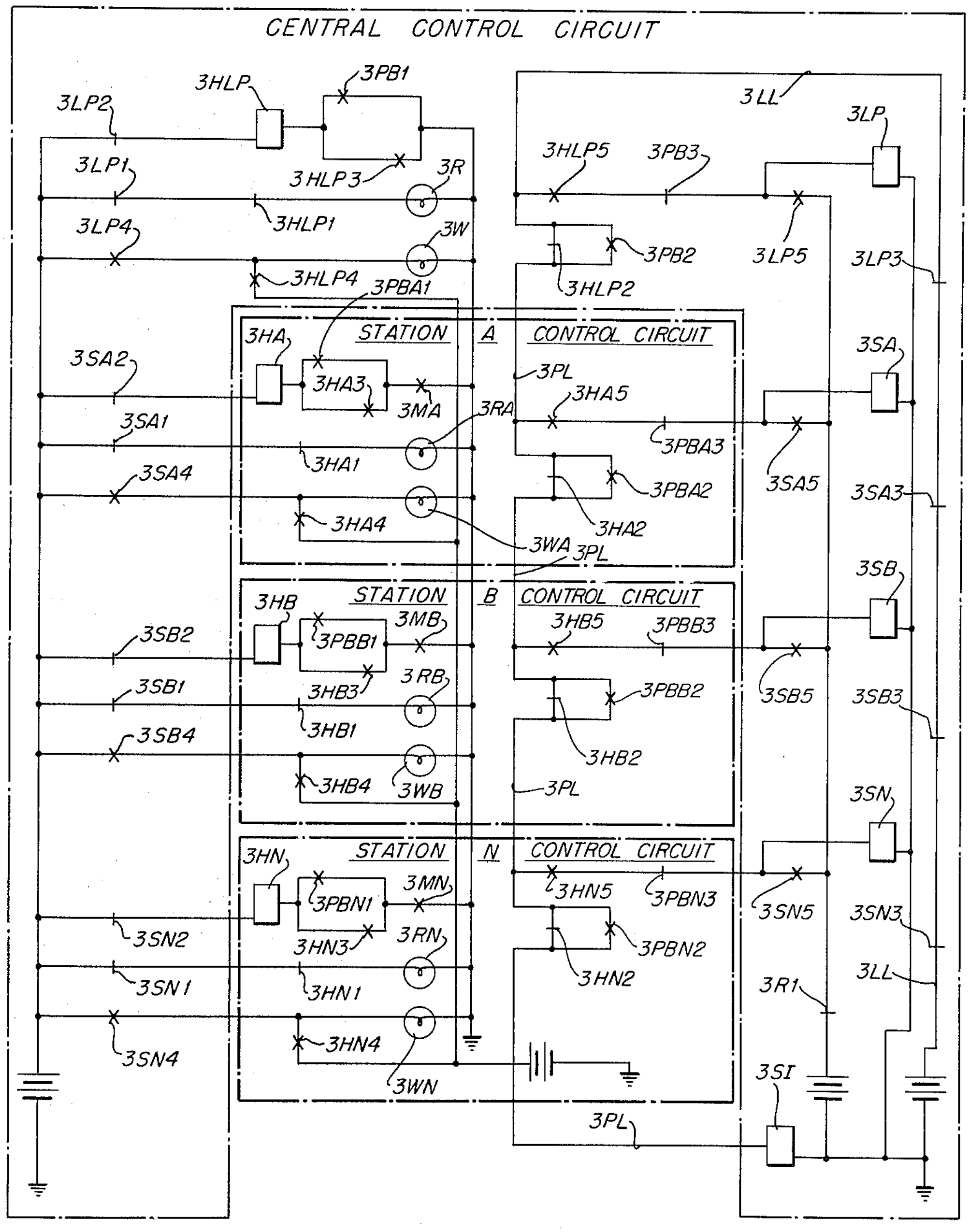
FIG. 3 shows a circuit diagram of a plurality of station control circuits for the input of data and a portion of a central control circuit.
Figure 4:
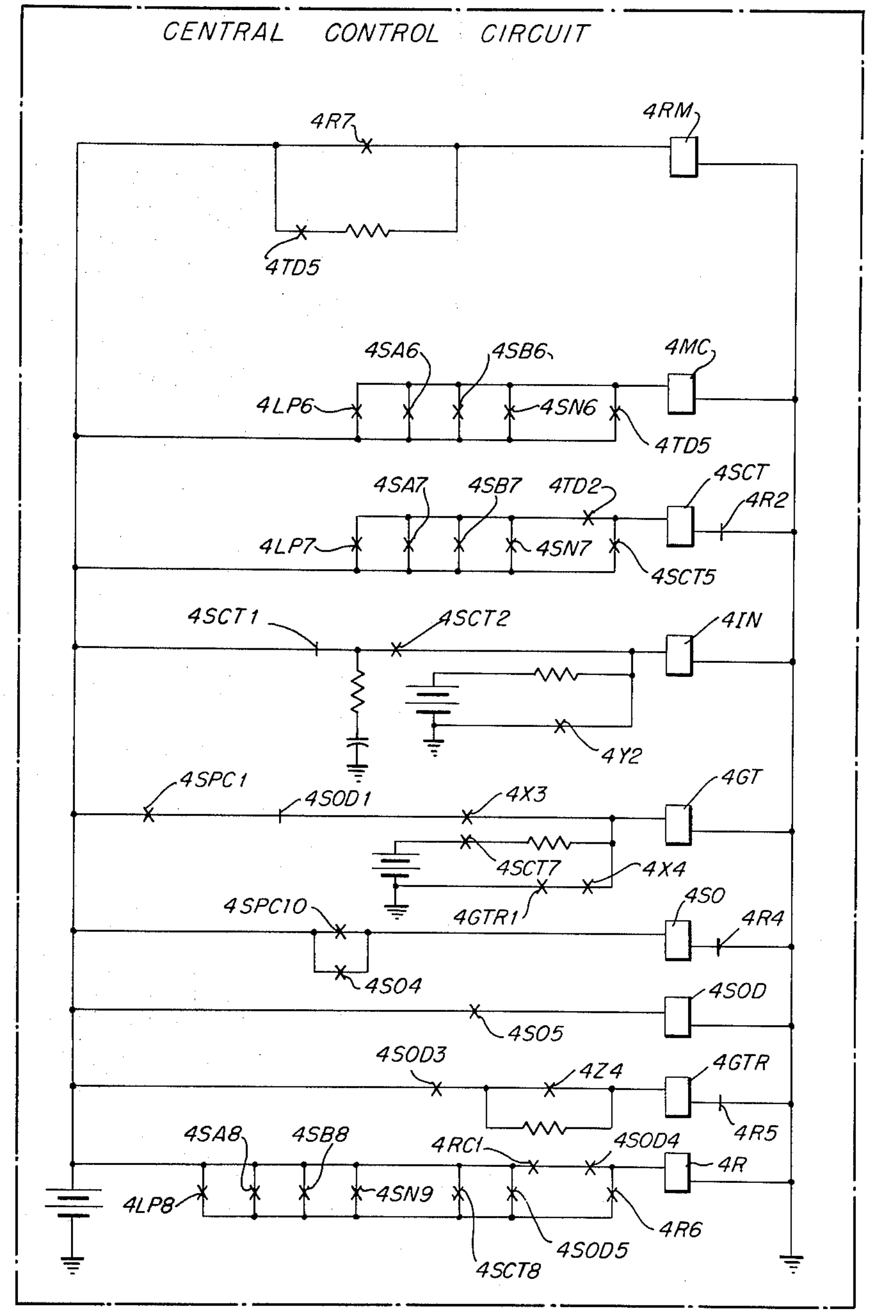
FIG. 4 is a circuit diagram of the main part of the central control circuit.

In order to punch leader, that is, advance the tape without recording data, a leader punching circuit is provided in the central control circuit and is shown in FIG. 3.

The leader punching circuit is similar to the station control circuit and central control circuit of station B and therefore will be explained below briefly.

The punch leader push button 3PB1 is depressed to energize hold leader punching relay 3HLP. Similar to the manner in which relay 3HB operated relay 3SB after the occurrence of certain conditions, so also relay 3HLP operates leader punching relay 3LP.

Operation of relay 3LP effectuates operation of the data transmission and collection system in the same manner that relay 3SB effectuated such operation, as previously explained. Thus, punching pulses are transmitted from source 11SAC to punching device lead 11PDL6 to operate the tape feeding station and thereby advance tape 5T. Inasmuch as no station relays 3SA, 3SB, 3SN can now be operated because relay 3LP is operated, stepping switch leads 11LA, 11LB, 11LC and 11LD are disconnected from the relay trees and it is therefore impossible to transmit data from the card reader to the relay tree leads 11RTL1–3. Therefore, blank tape is simply advanced by the tape feeding station.

It is to be understood that the above-described embodiment is merely illustrative of an application of the principles of the invention and that various modifications will be apparent to those skilled in the art without departing from the principles and scope of the present invention.

What is claimed is:

1. A data transmission and collection system comprising a plurality of stations of varying priority for the input of data at each station in the form of a plurality of parallel signals each of at least one serial bit, a plurality of station control circuits associated with each data input station, means enabled by the input of data for operating the station control circuits, a central control circuit responsive to the operation of the station control circuits for preventing transmission of data from any of the stations having a priority lower than one of the stations which is awaiting to transmit data and for preventing simultaneous transmission of data from said stations, means responsive to the central control circuit for producing a synchronizing signal, means responsive to the synchronizing signal for producing a phase controlling signal, means responsive to the phase controlling signal for decreasing the number of parallel signals and increasing the number of serial bits of each decreased parallel signal of the data input stations, and means responsive to the phase controlling signal and the decreased number of parallel signals for recording the data on tape.

2. A system for transmitting and collecting data comprising a plurality of stations of varying priority for the input of data in the form of a plurality of parallel signals each of one serial bit, a plurality of station control circuits associated with each data input station, means enabled by the input of data for operating said station control circuits, a central control circuit responsive to the operation of the station control circuit for establishing a priority sequence for the transmission of data from the plural input stations for both preventing simultaneous transmission of data from said stations and preventing transmission of data from any of the stations having a priority lower than one of the stations which is awaiting to transmit data and for a tape punching device responsive to the central control circuit for producing, a synchronizing signal, a phase control circuit responsive to the synchronizing signal for producing a phase controlling signal, means responsive to the phase controlling signal for decreasing the number of parallel signals and increasing the number of serial bits of each decreased parallel signal from the data input stations, whereby said decreased number of parallel signals of serial bits operate the tape punching device to record the data of the plural input stations on tape.

3. A data transmission and collection system comprising a plurality of stations at remote locations for the input of data in the form of a plurality of parallel signals each of one serial bit, a plurality of station control circuits associated with each data input station, means enabled by the input of data at the stations for operating the station control circuits, a central control circuit responsive to the operation of the station control circuits for establishing a priority sequence for the transmission of data from the plural input stations and for preventing simultaneous transmission of data from said stations, a tape punching device responsive to the central control circuit for producing a synchronizing signal, a phase control circuit responsive to the synchronizing signal for producing a phase controlling signal, stepping switch means responsive to the phase control signal and rendered effective by the central control circuit, a scanner responsive to the phase controlling signal and operated by the central control circuit for operating said stepping switch means, and a plurality of relay trees responsive to the operation of the stepping switch and cooperating with the scanner for converting the parallel signals from the data input stations to a lesser number of parallel signals of plural serial bits, whereby said parallel signals of serial bits operate the tape punching device to record the data of the plural input stations on tape.

4. A data transmission and collection system comprising a plurality of stations at remote locations for the input of data in the form of a plurality of parallel signals each of one serial bit;

a plurality of station control circuits associated with each data input station;

means enabled by the input of data at the stations for operating the station control circuits;

a central control circuit responsive to the operation of the station control circuits for establishing a priority sequence for the transmission of data from the plural input stations and for preventing simultaneous transmission of data from said stations;

a tape punching device responsive to the central control circuit for producing a synchronizing signal;

a phase control circuit responsive to the synchronizing signal for producing a phase controlling signal;

stepping switch means responsive to the phase controlling signal and rendered effective by the central control circuit;

a scanner also responsive to the phase controlling signal and operated by the central control circuit for rendering effective said stepping switch means, said scanner including a first plurality of normally open contacts, a second plurality of normally open contacts, a source of alternating current, means responsive to half cycles of one polarity of said source for successively closing said second normally open contacts, and means responsive to half cycles of the other polarity of said source and the successive closing of said second normally open contacts for successively closing said first normally open contacts; and a plurality of relay trees responsive to the operation of the stepping switch means and the successive closing of said first normally open contacts of said scanner for converting the parallel signals from the data input stations to a lesser number of parallel signals of plural serial bits, whereby said parallel signals of serial bits operate the tape punching device to record the data of the plural input stations on tape.

5. A data transmission and collection system comprising:

a plurality of stations at remote and separate locations, having a plurality of normally open contacts selectively closable by the insertion of a data card at such stations for putting data into the system in the form of a plurality of parallel signals each of one serial bit, and having a predetermined priority sequence for the transmission of the data;

a station control circuit at each data input station, each station control circuit including means serially interconnecting each station for establishing the priority sequence, switch means operated by the insertion of the data card, hold relay means for maintaining a station in an operated condition, and push button means enabled by the operation of the switch means for operating said hold relay means to prevent a station of lower priority than the station having the card inserted therein from putting data into the system;

a tape punching device, including punching means, for collecting and recording the data put into the system by the data card on tape and for producing a synchronizing signal;

a central control circuit including station relay means, associated with each station and operated by the operation of the hold relay means of each station control circuit if none of the stations of the system are transmitting data from the data card or if none of the higher priority stations are waiting to transmit, for rendering ineffecive the hold relay means and for operating the tape punching device to produce the synchronizing signal;

a phase control circuit responsive to the synchronizing signal for producing a phase controlling signal;

stepping switch means responsive to the phase controlling signal and rendered effective by the operation of the station relay means;

a delay-scanner starting circuit operated by the operation of the station relay means;

a scanner also responsive to the phase controlling signal and operated by the delay-scanner starting circuit for operating said stepping switch means; and a plurality of relay tree means connected to the normally open contacts at each data input station and operated by the operation of the stepping switch means and the scanner for simultaneously reducing the number of parallel signals of input data and increasing the number of serial bits of said reduced number of parallel signals to operate the tape punching means of the tape punching device to record the data of the data card on the tape.

6. A data transmission collection system comprising:

a plurality of stations at remote and separate locations, having a plurality of normally open contacts selectively closable by the insertion of a data card at such stations for putting data into the system in the form of a plurality of parallel signals each of one serial bit, and having a predetermined priority sequence for the transmission of the data;

a station control circuit at each data input station, each station control circuit including means serially interconnecting each station for establishing the priority sequence, first means responsive to the non-insertion of a data card at each station for indicating that the station is conditioned for the insertion of the data card at such station, second means responsive to the insertion of the data card at each station for indicating that the station is waiting to have the data on the card put into the system, switch means operated by the insertion of the data card, hold relay means serially connected to the switch means for maintaining the station in an operated condition and for rendering ineffective said first indicating means and for rendering effective said second indicating means, and normally opened push button means enabled by the operation of the switch means and depressable for operating said hold relay means to render ineffective said first indicating means and to render effective said second indicating means and releasable for preventing a station of lower priority than the station having the card inserted therein from putting data into the system;

a tape punching device, including punching means, for collecting and recording the data put into the system by the data card on tape and for producing a synchronizing signal;

a central control circuit including station relay means, associated with each station and operated by the operation of the hold relay means and the release of the normally open push button means of each station control circuit if none of the stations of the system are transmitting data from the data card or if none of the higher priority stations are waiting to transmit, for rendering ineffective the hold relay means, for maintaining the second indicating means effective and for operating the tape punching device to produce the synchronizing signal;

a phase control circuit responsive to the synchronizing signal for producing a phase controlling signal;

stepping switch means responsive to the phase controlling signal and rendered effective by the operation of the station relay means;

a delay scanner starting circuit operated by the operation of the station relay means;

a scanner also responsive to the phase controlling signal and operated by the delay scanner starting circuit for operating said stepping switch means; and a plurality of relay tree means connected to the normally open contacts of each data input station and operated by the operation of the stepping switch means and the scanner for simultaneously reducing the number of parallel signals of input data and increasing the number of serial bits of said reduced number of parallel signals to operate the tape punching means of the tape punching device to record the data of the data card on the tape.

References Cited by the Examiner

UNITED STATES PATENTS

| | | | |
|---|---|---|---|
| 1,927,556 | 9/1933 | Nelson | 178—2 |
| 1,957,502 | 5/1934 | Locke | 178—53 |
| 2,356,221 | 8/1944 | Cox | 178—53 |
| 2,871,286 | 1/1959 | Bacon et al. | 178—2 |
| 2,903,686 | 9/1959 | Bridges | 340—347 |
| 2,918,654 | 12/1959 | Hillyer | 340—150 |
| 2,921,132 | 1/1960 | Fiver | 340—347 |
| 3,025,498 | 3/1962 | Blodgett | 340—147 |
| 3,029,414 | 4/1962 | Schrimpf | 340—147 |

NEIL C. READ, *Primary Examiner.*

R. H. ROSE, *Examiner.*

T. A. ROBINSON, *Assistant Examiner.*